US009239672B2

(12) United States Patent
Kraut

(10) Patent No.: US 9,239,672 B2
(45) Date of Patent: Jan. 19, 2016

(54) USER INTERFACE FOR DATA COMPARISON

(75) Inventor: Joel Kraut, San Francisco, CA (US)

(73) Assignee: MeLLmo Inc., Solana Beach, CA (US)

( * ) Notice: Subject to any disclaimer, the term of this patent is extended or adjusted under 35 U.S.C. 154(b) by 0 days.

(21) Appl. No.: 13/415,651

(22) Filed: Mar. 8, 2012

(65) Prior Publication Data

US 2012/0272186 A1      Oct. 25, 2012

Related U.S. Application Data

(63) Continuation of application No. PCT/US2011/033324, filed on Apr. 20, 2011.

(51) Int. Cl.

| G06F 3/0481 | (2013.01) |
|---|---|
| G06F 3/0488 | (2013.01) |
| G06F 3/0484 | (2013.01) |
| G06F 9/54 | (2006.01) |
| G06F 3/0486 | (2013.01) |
| G06Q 30/02 | (2012.01) |

(52) U.S. Cl.
CPC ............ *G06F 3/0488* (2013.01); *G06F 3/0481* (2013.01); *G06F 3/0486* (2013.01); *G06F 3/04847* (2013.01); *G06F 3/04886* (2013.01); *G06F 9/543* (2013.01); *G06Q 30/02* (2013.01)

(58) Field of Classification Search
CPC ... G06F 3/04847; G06F 3/0481; G06F 9/543; G06F 3/04886; G09G 2340/04
USPC ......... 715/810, 765, 767, 770–773, 798–802, 715/834, 861, 964; 345/440, 676
See application file for complete search history.

(56) References Cited

U.S. PATENT DOCUMENTS

| 7,409,310 | B1 * | 8/2008 | Wade ............................. 702/130 |
|---|---|---|---|
| 7,901,400 | B2 * | 3/2011 | Wham et al. ..................... 606/34 |
| 8,390,624 | B2 * | 3/2013 | Kohut et al. .................. 345/440 |
| 2002/0026247 | A1 * | 2/2002 | Ikami ................................ 700/1 |
| 2003/0071814 | A1 * | 4/2003 | Jou et al. ....................... 345/440 |

(Continued)

FOREIGN PATENT DOCUMENTS

| JP | 2002-215226 A | 7/2002 |
|---|---|---|
| JP | 2004-202016 A | 7/2004 |

(Continued)

OTHER PUBLICATIONS

PCT International Search Report and Written Opinion, PCT/US2011/033324, Jan. 2, 2012, 11 Pages.

*Primary Examiner* — Steven Sax
(74) *Attorney, Agent, or Firm* — Fenwick & West LLP

(57) ABSTRACT

Systems and methods perform comparison of data represented as charts, for example, bar graphs, pie charts, line charts or stacked bar charts. The charts present visual representations mapping source values to target values. A user can select charts associated with a data records for comparison from an index of data records. The user selects a chart and a particular source value from the reference chart. The target values corresponding to the source value from other charts are compared against the target value from the reference chart. An aggregate of the target values associated with the source value from each chart may be presented to the user. The user can also use multi-touch input to select object representing data and drag them to perform actions associated with the objects. The actions performed on the objects depend on the locations of the objects as the user drags them.

17 Claims, 14 Drawing Sheets

(56) References Cited

U.S. PATENT DOCUMENTS

| | | | |
|---|---|---|---|
| 2003/0137541 A1* | 7/2003 | Massengale et al. | 345/764 |
| 2003/0210181 A1* | 11/2003 | Hager et al. | 342/165 |
| 2003/0218619 A1* | 11/2003 | Ben-Tovim | 345/649 |
| 2004/0252074 A1* | 12/2004 | Schaper | 345/1.1 |
| 2005/0232055 A1* | 10/2005 | Couckuyt et al. | 365/227 |
| 2005/0234362 A1* | 10/2005 | Kaiser et al. | 600/515 |
| 2005/0257158 A1* | 11/2005 | Lombardo | 715/751 |
| 2006/0125827 A1 | 6/2006 | Adereth et al. | |
| 2006/0251317 A1* | 11/2006 | Eran et al. | 382/144 |
| 2007/0101255 A1 | 5/2007 | Garg et al. | |
| 2008/0027933 A1* | 1/2008 | Hussam | 707/6 |
| 2008/0033587 A1* | 2/2008 | Kurita et al. | 700/100 |
| 2008/0104526 A1* | 5/2008 | Jaeger | 715/763 |
| 2008/0104571 A1* | 5/2008 | Jaeger | 717/113 |
| 2008/0319724 A1* | 12/2008 | Domijan et al. | 703/2 |
| 2009/0256846 A1* | 10/2009 | Zahariev | 345/440 |
| 2010/0058250 A1* | 3/2010 | Stannard et al. | 715/856 |
| 2010/0185984 A1* | 7/2010 | Wright et al. | 715/833 |
| 2010/0231595 A1* | 9/2010 | Dang et al. | 345/440 |
| 2010/0253686 A1* | 10/2010 | Alsbury et al. | 345/440 |
| 2011/0087985 A1* | 4/2011 | Buchanan et al. | 715/771 |
| 2011/0283188 A1* | 11/2011 | Farrenkopf | G06F 3/0488 715/702 |
| 2012/0000268 A1* | 1/2012 | Li et al. | 73/1.01 |
| 2012/0005045 A1* | 1/2012 | Baker | 705/27.2 |
| 2012/0136822 A1* | 5/2012 | Selman | 706/47 |

FOREIGN PATENT DOCUMENTS

| | | |
|---|---|---|
| KR | 10-2009-0107152 A | 10/2009 |
| KR | 10-2010-0129015 A | 12/2010 |

* cited by examiner

USER INTERFACE FOR DATA COMPARISON

CROSS-REFERENCE TO RELATED APPLICATIONS

This application is a continuation of PCT Application No. PCT/US2011/033324, filed on Apr. 20, 2011, which is incorporated by reference herein in its entirety.

BACKGROUND

1. Field of Art

The disclosure generally relates to user interface for presenting data records as charts on a display device, and in particular to comparing data presented as charts.

2. Description of the Related Art

There are several ways of using charts or graphs to visually present statistical data available in reports including, for example, bar charts, pie charts, line graphs, and scatter graphs. Users often have to compare related data from one or more reports. For example, a user may want to compare reports that represent data associated with different time intervals, such as reports describing sales statistics for two different quarters. The user may view the individual reports as charts. However for comparison purposes the user may have to identify matching data points from the charts and manually compare the values. The comparison may be performed using a calculator or an analysis tool, for example, a spreadsheet. Such manual comparison can be a tedious and slow process. Alternatively, if the data is stored using a database management system, the user may be able to generate customized reports that compare data from existing reports. However, writing customized reports can be a complex task in itself, requiring expertise with the database system. Data comparison is often performed by business experts who are unlikely to also have the expertise required for handling the complexities of reporting systems. Often, enterprises engage in complex and expensive processes of gathering requirements from business experts, preparing specifications for experts in reporting systems, and go through the development cycles for preparing customized reports required by the business experts.

SUMMARY

Described embodiments enable comparison of data presented as graphically, e.g., in charts. A plurality of charts are presented on a display device. Each chart displays a plurality of tuples, each tuple associating a source value with a target value. Input is received identifying a first tuple from a reference chart. Each of the other plurality of charts displays a tuple including the first source value. Each of the other plurality of charts also displays indicia of a difference between the target value of the displayed tuple and the target value of the first tuple.

In some embodiments, an aggregate value based on data from charts is presented. A plurality of charts is associated with a plurality of source values. Each chart maps source values to target values. An input is received identifying a first source value. On each of the plurality of charts, a tuple from the chart including the first source value is displayed. An aggregate value based on the target values from the displayed tuples from each of the charts is presented.

In various embodiments, multi-touch input is used to perform actions associated with objects on a display device. A plurality of objects are displayed on a display device, each object displayed on a position on the display device. A multi-touch input selecting a first object and a second object from the plurality of objects is received. The multi-touch input drags the first object to a first destination position and the second object to a second destination position. A first action determined according to the first destination position is performed on the first object. A second action determined according to the second destination position is performed on the second object.

The actions performed on an object may depend on the position of the object on the display screen. The first and second actions may correspond to a single action associated with the first and second objects. For example, the single action may determine an aggregate value based on data associated with the objects. Examples of aggregate values include a statistical metric for example, a mean, median, or mode operation. The single action may depend on the distance between the objects as they are dragged.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features that will be more readily apparent from the detailed description, the appended claims, and the accompanying figures. A brief introduction of the figures is below.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1A:
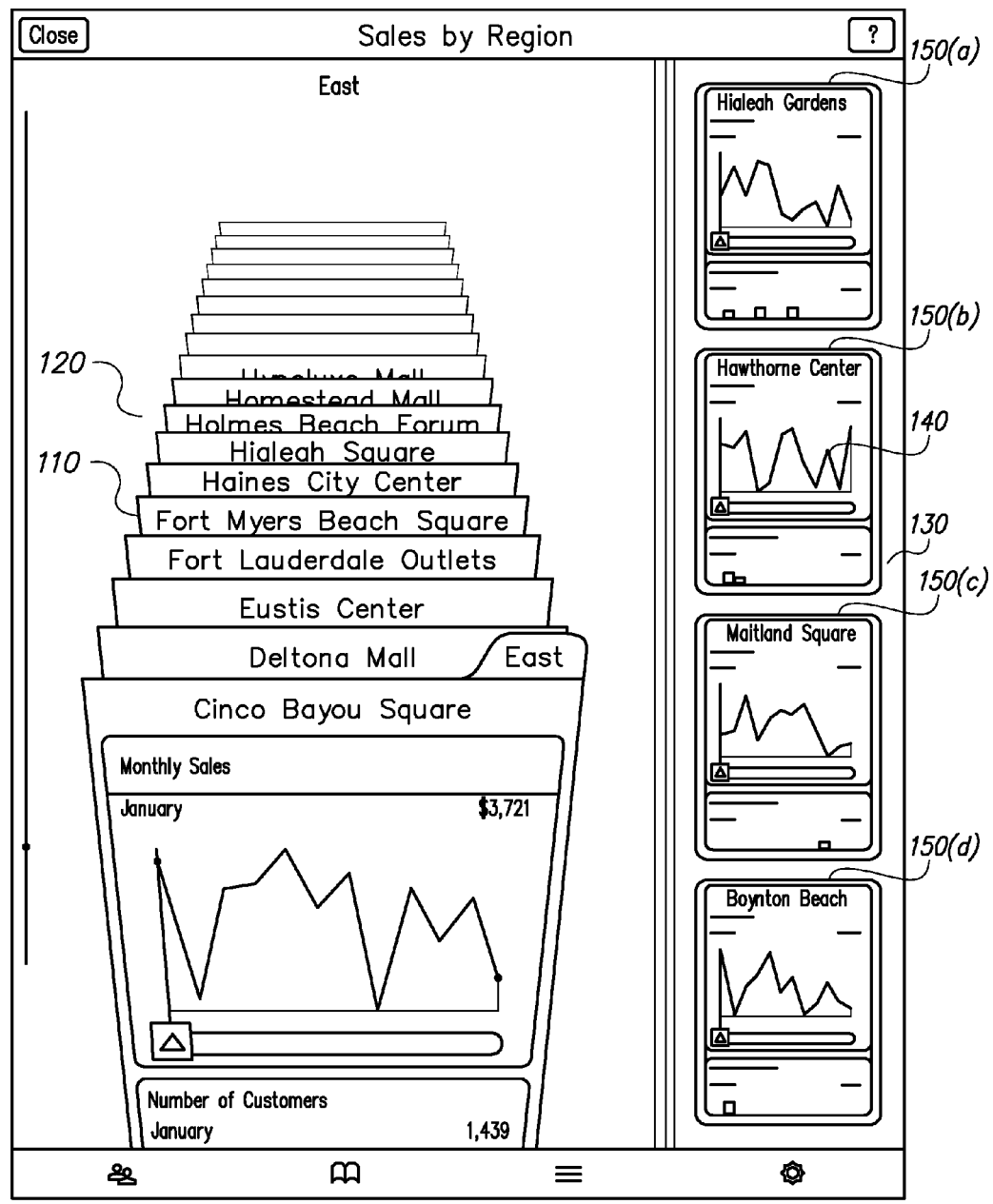
FIGS. 1(a) and 1(b) show graphical user interfaces displaying a simulated catalogue of database records for allowing a user to select data sets for comparison, in accordance with an embodiment of the invention.
Figure 1B:
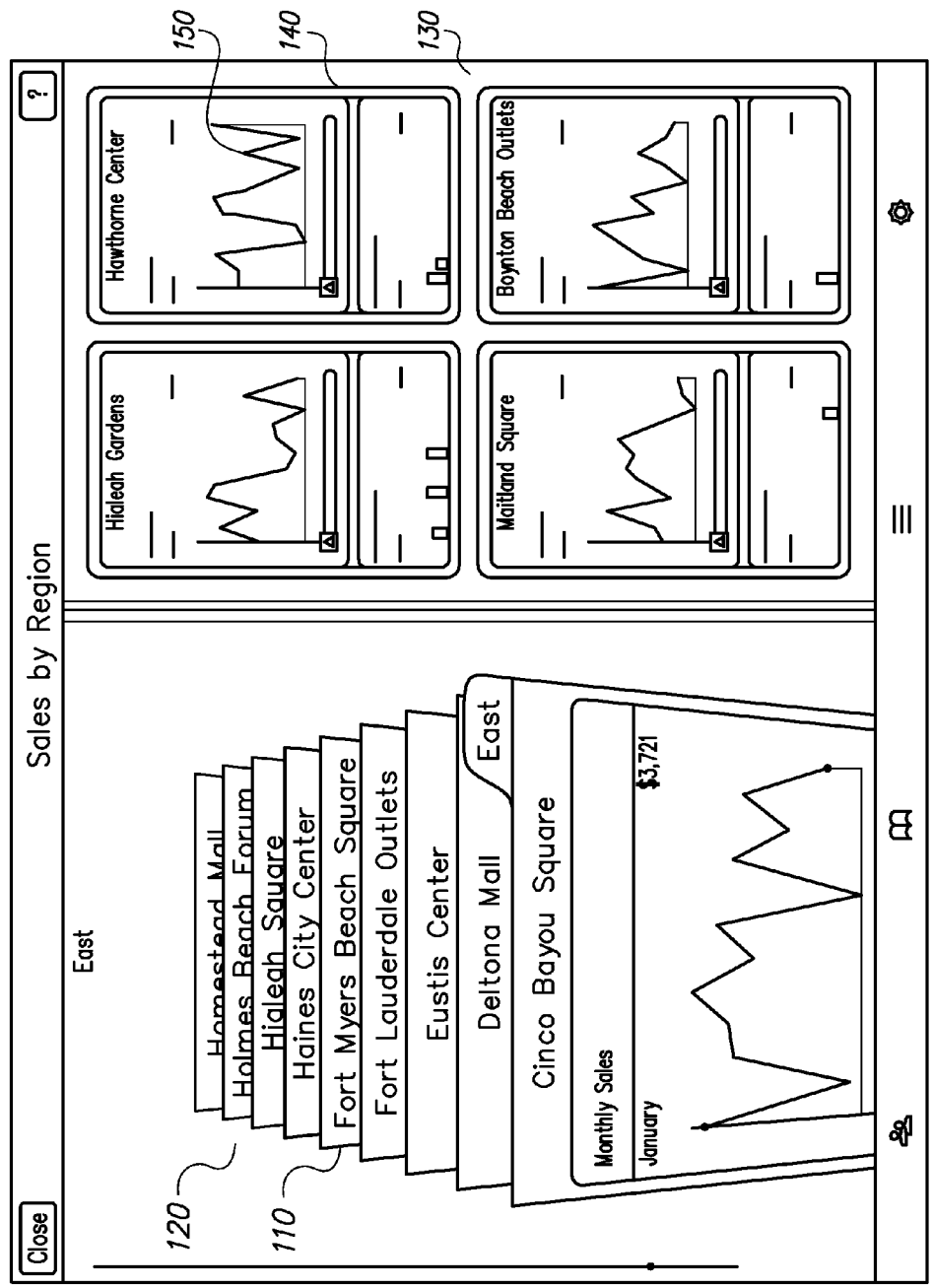

FIGS. 1(a) and 1(b) show graphical user interfaces displaying a simulated catalogue 120 of data records for allowing a user to select data records for comparison, in accordance with an embodiment of the invention. The data records 110 may represent pages of data from a report stored in the database. A user performs a swiping motion that causes the cards of the simulated catalogue 120 to move in the direction of the swipe, such that they appear to either move backwards from the viewer or forward towards the viewer. A user may select one or more data records 110 from the catalogue for comparison, for example by dragging the records from the simulated catalogue 120 to a data comparison panel 130. The representation 150 of the records in the data comparison panel 130 may be different from the representation of the data records 110 in the simulated catalogue. For example, the data sets corresponding to the records may be displayed as charts 140. FIGS. 1(a) and 1(b) show the data sets corresponding to the records represented as line charts. Other embodiments display the data sets as pie charts, bar graphs, stacked bar charts or other types of visual representations. A "chart" refers to a graphical representation of data, e.g., graphs, line charts, pie charts, bar graphs, stacked bar charts, multi-dimensional graphs etc.

FIG. 1 and the other figures use like reference numerals to identify like elements. A letter after a reference numeral, such as "150(a)," indicates that the text refers specifically to the element having that particular reference numeral. A reference numeral in the text without a following letter, such as "150," refers to any or all of the elements in the figures bearing that reference numeral (e.g. "150" in the text refers to reference numerals "150(a)" and/or "150(b)" in the figures).

Figure 4A:
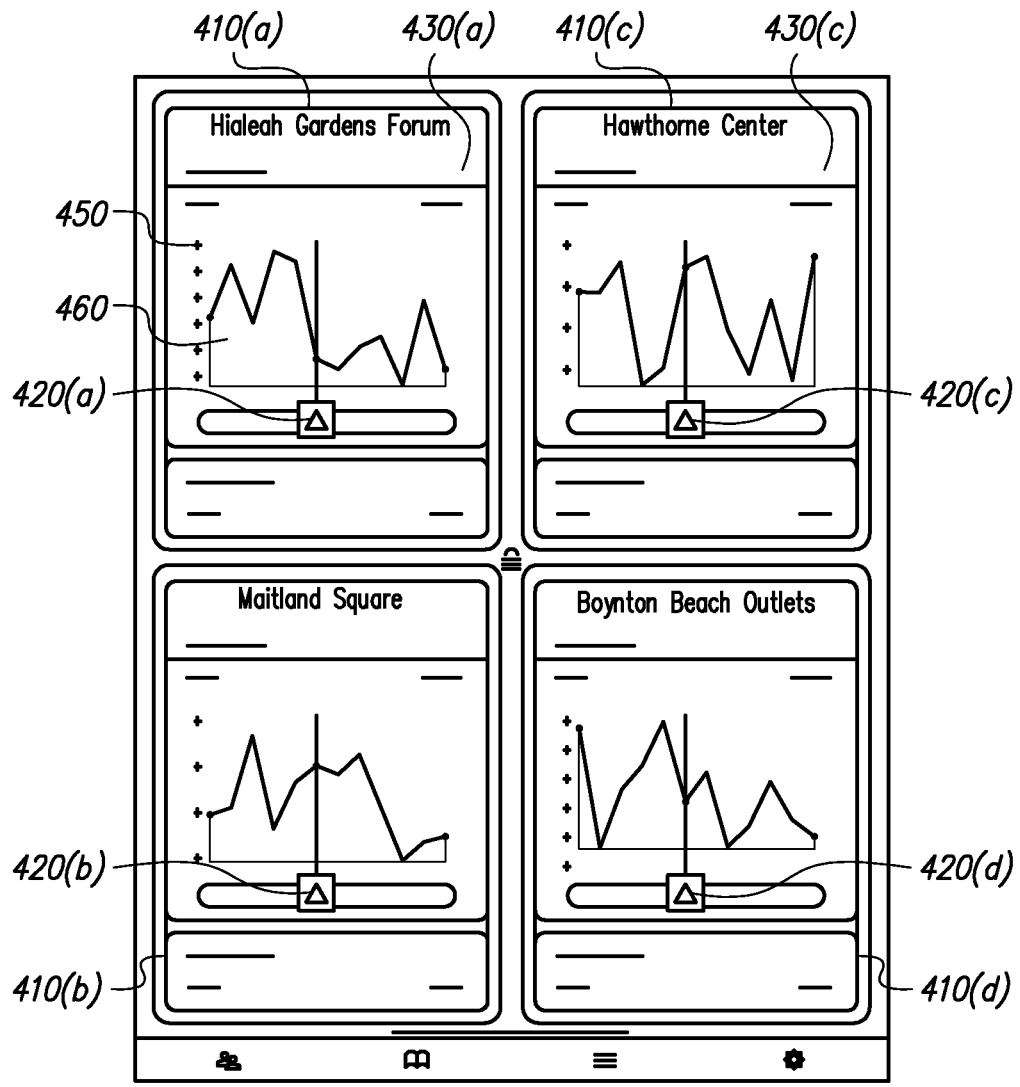
FIGS. 4(a), 4(b), and 4(c) show a graphical display illustrating comparison of data sets presented as line charts, in accordance with an embodiment of the present invention.
Figure 4B:
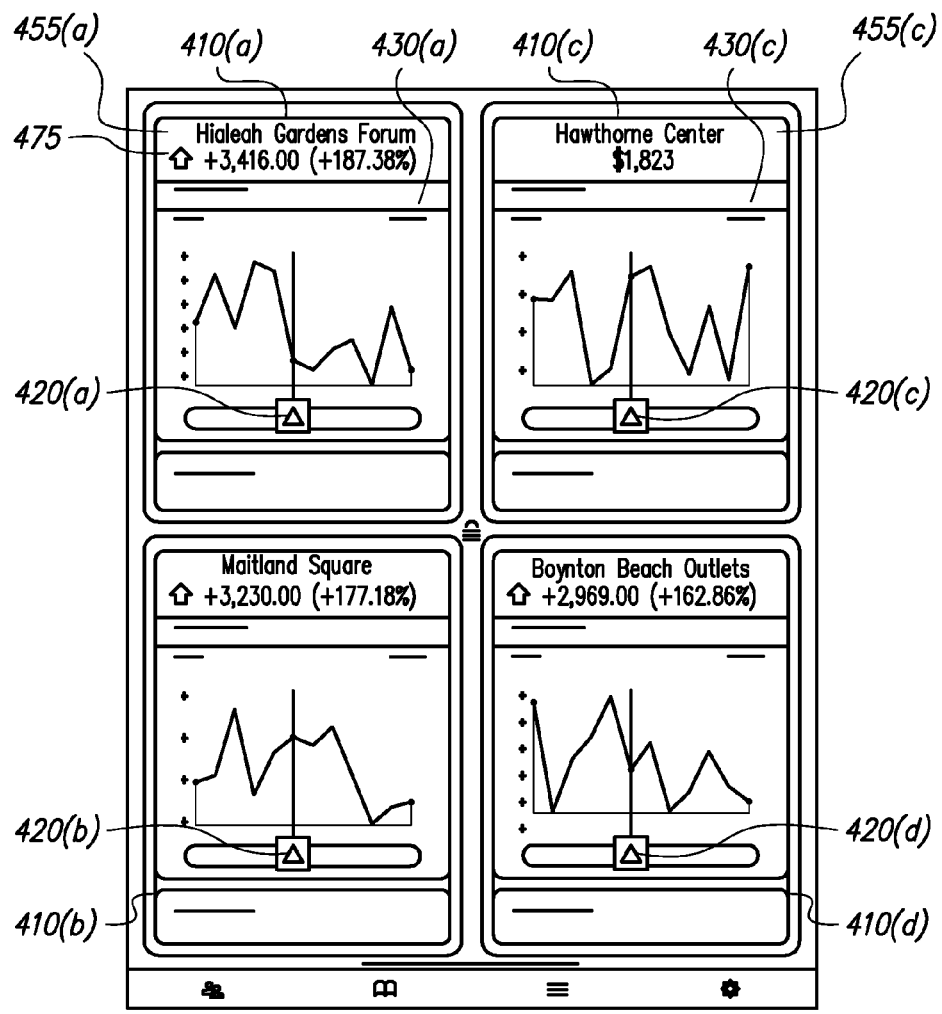
Figure 4C:
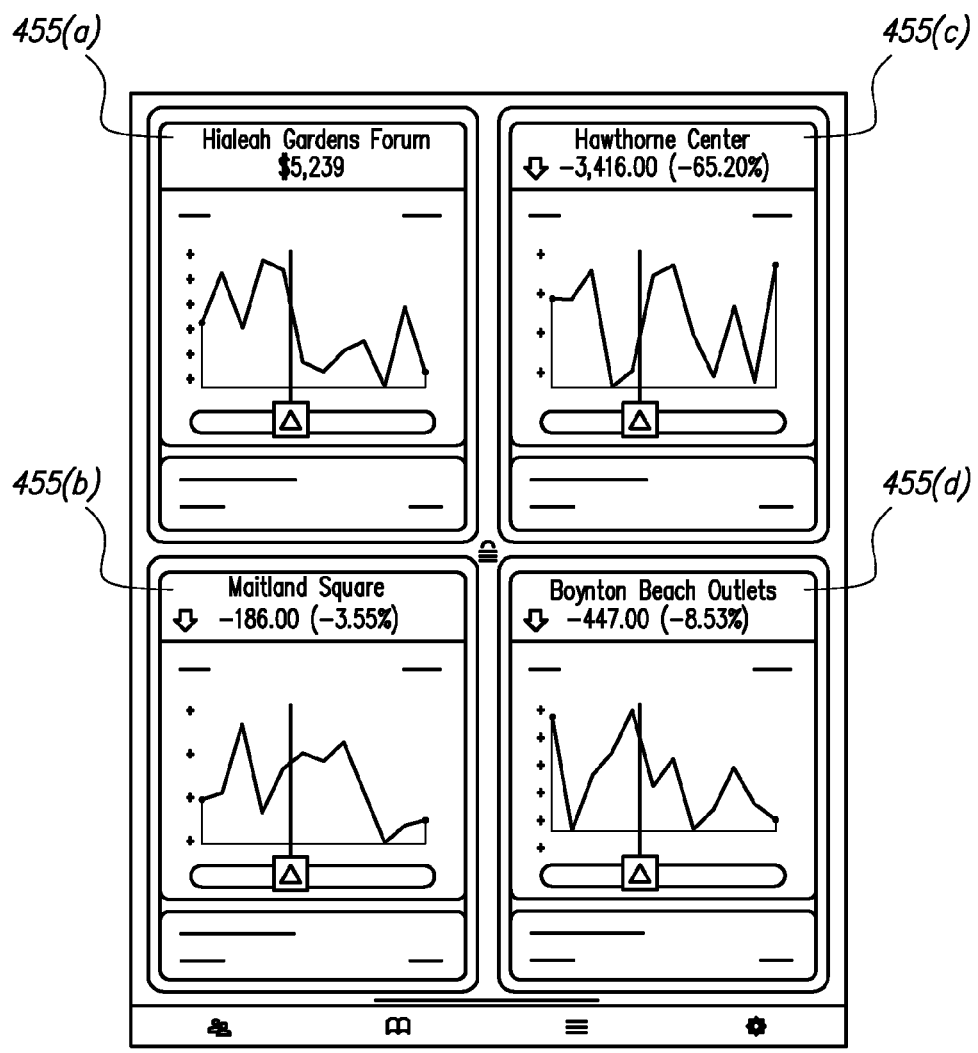

FIG. 1(a) shows the charts corresponding to the data records in the data comparison panel 130 arranged in one particular orientation, stacked on top of each other. FIG. 1(b) shows the charts corresponding to the data records in the data comparison panel 130 arranged as an array of rows and columns. Other embodiments may arrange the charts in other orientations. FIGS. 1(a) and 1(b) show the panel data comparison 130 adjacent to the simulated catalogue 120. The data comparison panel 130 may be shown in other positions, for example, on a separate virtual screen. In an embodiment, after the user has selected the data records from the simulated catalogue 120 and added them to the data comparison panel 130, the user can indicate to the user interface manager 215 (FIG. 2) to hide the simulated catalogue 120. Accordingly, the data comparison panel 130 is shown on a full screen (for example, as shown in FIGS. 4(a), 4(b), and 4(c).) This allows the user to perform data comparison using the charts in a larger viewing area. The user can indicate to the user interface manager 215 to show the simulated catalogue 120 if he user wants to select a different set of data records.

Figure 2:
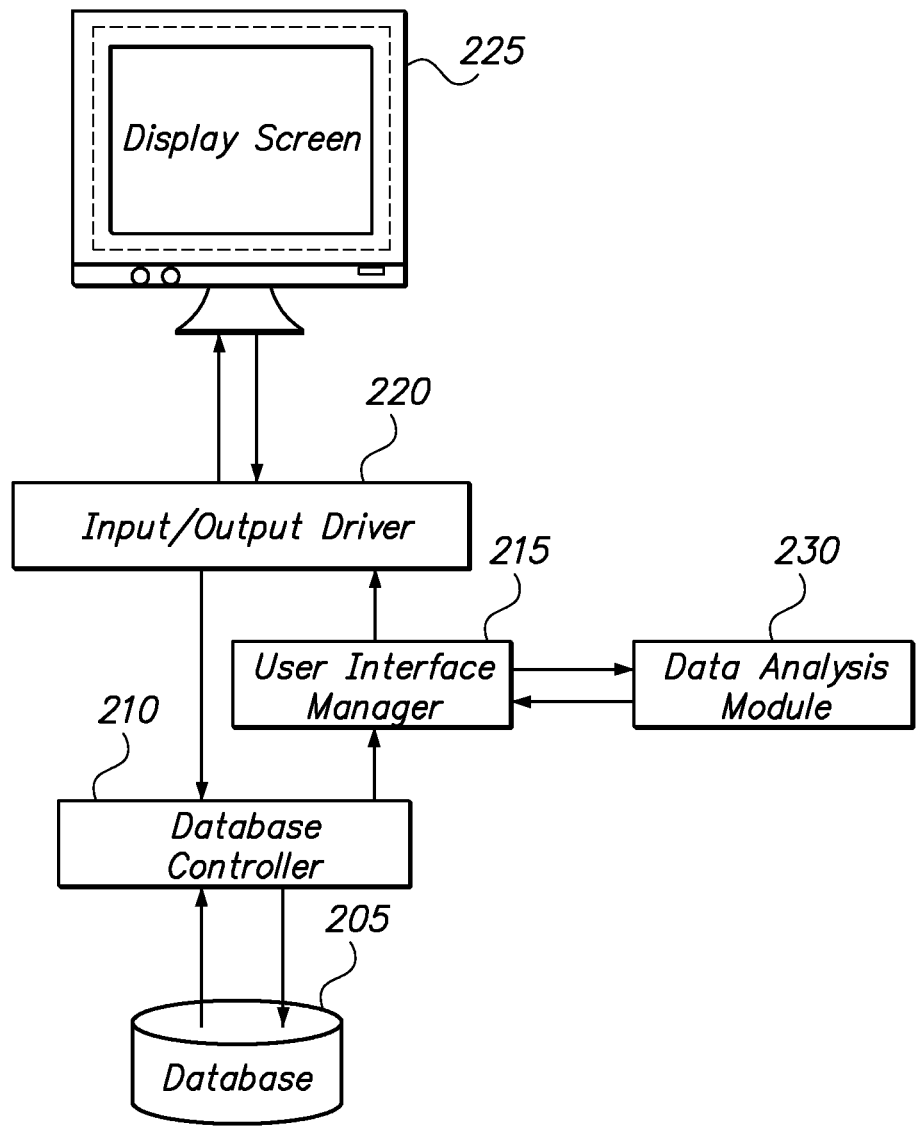
FIG. 2 illustrates the architecture of a system for allowing comparison of data, in accordance with an embodiment of the invention.

FIG. 2 is a block diagram of system architecture of a device in accordance with one embodiment. The device 200 includes a database (DB) 205, a DB controller module 210, a user interface module 215, a data analysis module 230, an input/output (driver (IO driver) module 220, and a display screen 225. As used herein, the term "module" refers to a computer program logic and/or data for providing the specified functionality. A module can be implemented in hardware, firmware, and/or software. Examples of types of devices 200 shown in FIG. 2 include tablet computers, smart phone devices, and mobile phones. In various embodiments, device 200 includes a touch screen display enabling a user to provide input using one or more fingers, a stylus, or other pointing device.

The DB 205 stores data and metadata associated with reports. The DB 205 in one embodiment is implemented using a hard disk drive but can also be implemented using any other device capable of storing data, such as a writeable compact disc (CD) or DVD, or a solid state memory device, for example a flash memory. The DB controller module 210 implements the logic to interface with the DB 205 so as to read data from the DB 205 or write data to the DB 205.

The DB controller 210 provides data to the user interface manager 215, which determines information required for rendering the data. For example, the user interface manager 215 can determine the dimensions of a pie chart if the data needs to be displayed as a pie chart. The user interface manager 215 may interact with the data analysis module 230 to perform computations related to information being displayed. For example, depending on the user request, the data analysis module 230 may perform mathematical computations to determine the result being displayed. For example, if the user wants to view a particular statistical metric based on a set of values, the data analysis module 230 performs the required computations to determine the result being displayed.

The data and the information necessary for rendering the data are provided by the user interface manager 215 to the input/output driver 220. The input/output driver 220 provides the display screen 225 with instructions and data necessary for displaying data and/or images. In various embodiments, the display screen 225 is used to input data and/or commands. For example, a touch sensitive screen can sense the coordinates of the portion of the screen touched by a user. The user may touch the display screen 225, for example, to select a command from a list of commands or to select a data element from a list of data elements displayed on the screen. In some embodiments, a pointing device, such as a thumbwheel, mouse, track ball, or other type of pointing device is used to input data or commands into the system. The input/output driver 220 sends the data or instructions provided by the display screen 225 to the DB controller 210. The DB controller 210 in response to data or instructions received from the input/output driver 220 reads data from DB 205 and writes data to DB 205.

A mobile device may be used to view reports available to a user. An example scenario allows the user to associate a particular report with a display mode, such as a pie chart, bar chart, or text mode. To allow the user to create an association between the report and a display mode, the user is presented with a list of display modes. The user may make a selection by touching the appropriate portion of the display screen 225 showing a specific mode of display, or by providing input through another mechanism such as a keyboard or pointing device. The DB controller 210 updates the metadata of the appropriate report in the DB 205 to store the information related to the mode of display of the report. The information associating the report with the mode of display can be used subsequently to display the report.

In another scenario, the user may be presented with a list of reports that can be reviewed. The user selects a particular report name and user interface manager 215 computes information to render the data, which is then displayed on display screen 225 in the specified format. The user may request certain statistical metrics based on data available in reports that can be determined by the user interface manager 215 by invoking the data analysis module 230 and presented using the input/output driver 220 on the display screen 225. Various other scenarios of interactions between the user and the various components and modules displayed in FIG. 2 are possible.

Data Comparison

Figure 3:
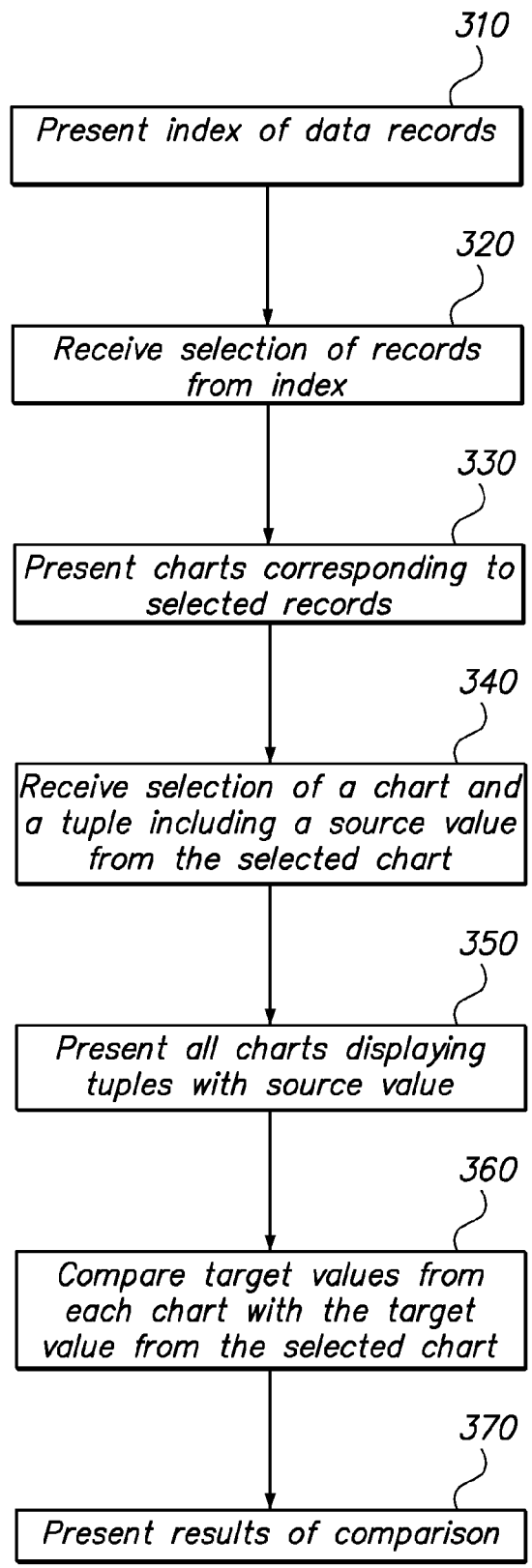
FIG. 3 shows a flowchart illustrating comparison of data records selected from a simulated catalogue, in accordance with an embodiment of the present invention.

FIG. 3 shows a flowchart illustrating comparison of data records selected from a simulated catalogue, in accordance with an embodiment of the present invention. The user interface manager 215 presents an index of data records on the display screen 225. The index of data records can be a simulated catalogue 120 as shown in FIGS. 1(a) and 1(b) that displays the data records as cards. The data records may be obtained by the user interface manager 215 from the database 205. The user interface presenting the index allows the user to scan through various records and to select individual records. For example, the user can scan through various records by performing a swiping motion that causes the cards representing the data records to move in the direction of the swipe, allowing user to view other data records. Furthermore, if the display screen 225 is touch-sensitive, a user can select a record from the index by touching the card corresponding to the record on the display screen 225. The user may touch a card and drag the card away from the index into the data comparison panel 130. The user interface manager 215 receives 320 the selection of the data records from the index made by the user.

The representation of a data record in the index may be different from the representation of the data record that is presented in the data comparison panel 130. For example, the user interface manager 215 may present 330 the data records as charts in the data comparison panel 130. In contrast, the data records in the index may be represented as cards of a simulated catalogue 120. The user can indicate that the user wants to view the data comparison panel 130 in a full screen mode rather than adjacent to the index.

A chart presents sets of tuples, each tuple comprising one or more data values. A tuple may comprise a source value and a target value. For example, a two dimensional chart including a line chart or bar chart maps source values from the x-axis to target values along the y-axis. The charts can be multidimensional charts, for example, three dimensional charts mapping an (x, y) coordinate to a value along a z-axis. A pie chart maps source value corresponding to categories for each pie to target values represented by the pie. A stacked bar chart can be considered as mapping a source value corresponding to an x-coordinate to a set of target values represented by individual bars along each stacked bar. Alternatively, the stacked bar chart may be considered as mapping a source value comprising an x-coordinate combined with an identification of an individual bar to a data value represented by the individual bar.

The user can perform data comparison using the charts presented in the data comparison panel 130. The user interface manager 215 receives 340 a user selection of a reference chart and a tuple comprising a source value from the reference chart. The set of source values for each of the chart can be the same. Alternatively, the sets of source values of the charts can overlap. For example, if the data records are presented as line charts comprising an x-axis and a y-axis, the user may select a particular x-coordinate from the reference chart. If the reference chart is a bar chart, the user may select a particular bar. If the reference chart is a pie chart, the user may select a pie. If the reference chart is a stacked bar chart, the user may select a stack of bars or an individual bar.

The user interface manager 215 may present 350 all the charts in the data comparison panel 130 such that they display a representation of a tuple from the chart comprising the source value. Each displayed tuple comprises the source value and at least one target value. The user interface manager 215 may highlight the displayed tuple of each chart to distinguish it from other tuples of the chart. The user interface manager 215 compares 360 target values from the displayed tuple of each chart with the target value from the reference chart and presents 370 the results of comparison.

For example, assume there are two charts in the data comparison panel 130 and the user selects a first chart and a source value associated with a target value from the first chart. The user interface manager 215 presents a portion of the second chart such that the portion displays a tuple of the second chart with the selected source value. The displayed tuple is highlighted to distinguish it from other tuples of the portion. A target value from the tuple of the second chart is compared against a target value of the first chart and the result of the comparison displayed.

In various embodiments, the differences between the value selected for comparison in the first chart and the corresponding values in other charts are highlighted. In various embodiments, highlighting is accomplished by a color associated with the presentation, a size of text for the presentation, or a shading associated with the presentation. For example, a color associated with the presentation can depend on whether the result is positive or negative. The result may be associated with red color if the result is negative and green color if the result is positive. The color may be associated with the text presenting the result or with a region in which the text is displayed. An up arrow may be presented if the result is positive and a down arrow if the result is negative. The size of a region associated with the result or the text of the result may depend on the result value. For example, bigger result values may be displayed more prominently with a larger font compared to smaller values. If the user points at a source value in a reference chart and moves the pointer so as to continuously change the selected input, the presentation of the result of comparison changes to match the corresponding changes in the source value.

In one embodiment, the user interface manager 215 presents an aggregate value based on the target values obtained from each chart in the data comparison panel 130. The user interface manager 215 sends the target values to data analysis module 230 to obtain the aggregate values based on the target values. The aggregate value can be a statistical metric, for example, a mean, median, or mode based on the target values. The presentation of the aggregate value including a color, shading, or text of the presentation can depend on the magnitude and sign (positive/negative) of the aggregate value. If the user points at a source value in a reference chart and moves the pointer so as to continuously change the selected input, the presentation of the aggregate value changes so as to track the changes in the source value.

Next we present several embodiments illustrating data comparison using charts. While the charts described in the embodiments include examples such as bar charts, stacked bar charts, line charts and pie charts, in various other embodiments different graphical representations of data sets can be used as a basis for performing comparisons. FIG. 4(a) shows a graphical display illustrating a comparison of data sets presented as line charts, in accordance with an embodiment of the present invention. FIGS. 4(a), 4(b), and 4(c) show four line charts corresponding to data records selected from the simulated catalogue 120. As shown in FIGS. 4(a), 4(b), and 4(c), each line chart 410 plots sales figures in thousands of dollars along the y-axis 450 and time along the x-axis 460 of the line charts. The user can select a particular data point 420(a) along the x-axis to view the sales figures corresponding to that data point. The user interface manager 215 may present the data figures corresponding to the data point 420(a) selected as text 430.

In one embodiment, when the user selects a data point 420(a) for a particular line chart 410(a), the user interface manager 215 automatically selects the corresponding data points 420(b), 420(c), and 420(d) on other line charts 410(b), 410(c), and 410(d) in the data comparison panel 130. The corresponding y-coordinate value for the other data charts may be obtained from the line chart or displayed as text 430 along with each line chart. If the user drags the selected data point 420(a) of chart 410(a) along the horizontal axis 460, the user interface manager 215 displays the corresponding data points 420(b), 420(c), 420(d) of the other charts as tracking the data point 420(a). The user is presented with the changing y-coordinate values 430 as the x-coordinate values change when the selected data point is dragged.

FIG. 4(b) shows an embodiment in which the user selects a data point 420(c) along the x-axis of a chart 410(c) and the user interface manager 215 displays a visual representation of the result of comparison of the data values from the remaining charts 410(a), 410(b), 410(d) with respect to the data value of the reference chart 410(c) at the data point 420. Solely for clarity of description, we refer to the chart 410(c) selected by the user as the reference chart. In various embodiments, the user can choose any of the charts to be the reference chart, depending on the way in which the user wants to compare data. For example, the data value 430(c) corresponding to the data point 420(c) in FIG. 4(b) is $1,823 and the corresponding data value 430(a) in the chart 410(a) at the data point 420(a) is $5,239. The reference chart 410(c) displays the value 430(c) in the region 455(c). The chart 410(a) shows the difference ($5,239−$1,823) of the values 430(a) and 430(c) in the region 455(a) as the value +3,416.00. The region 455(a) shows an up arrow 475 indicating that the value 430(a) is larger than the value 430(c). The region 455(a) shows the percentage difference between the values 430(a) and 430(c) as +187.38%.

The presentation of the region 455(a) may provide various visual indications comparing the value 430(a) with the value 430(b). For example, the region 455 may be presented in a particular color (say green) if the value of the corresponding chart is greater than the reference chart and another color (say red) if the value of the chart is smaller than the reference chart. In one embodiment, the difference between the data value 430(a) of the chart 410(a) compared to the reference chart 410(c) is displayed as text 475. The text 475 may show the actual magnitude of the difference of the values along with a positive or negative sign indicating whether the data value of the chart is larger or smaller than the data value from the reference chart. In one embodiment an arrow may be used with the text 475 to indicate whether the data value 430(a) of the chart 410(a) is larger smaller than the data value of the reference chart 410(c). For example, an up arrow may indicate the data value 430(a) of the chart 410(a) is larger and a down arrow may indicate the value is smaller.

In other embodiments, the region 455 may display a particular shading or shape depending on the result of comparison between the data value from this chart and the data value from the reference chart. A particular type of shading or shape may be used if the data value from the chart is larger than the data value from the reference chart and another type of shading or shape used if the data value is smaller. In an embodiment, presentation of the region 455 may depend on the magnitude of the difference between the data value of the chart and the data value of the reference chart. For example, the intensity of the shading or the size of the shape may increase with the magnitude of the difference between the two values. In another embodiment, the size of the text 475 displaying the difference between the values may depend on the magnitude of the difference. For example, the size of the text 475 may be increased as the magnitude of the difference between the values increases.

In one embodiment, a value obtained by computing a function based on all the data values from the charts 410 corresponding to the data point 420 is displayed. For example, the function can be a statistical aggregate function including a sum, product, mean, mode, or median based on the data values. The presentation of the aggregate value can depend on the magnitude and sign (positive or negative) of the value displayed. For example, positive values can be displayed using a particular color, shade, texture, or shape and negative values can be displayed using another color, shade, texture, or shape. Furthermore, the presentation of the value may depend on the magnitude of the value, for example, the size of the text may increase with the magnitude of the value or the intensity or brightness of color or shading of the presentation may change based on the magnitude. As the user drags the selected data point 420, the corresponding data values from all charts change resulting in change of the aggregate value displayed. Correspondingly the presentation of the aggregate value changes as the user drags the data point along the x-axis.

The charts presenting the data records can be multi-dimensional charts, for example, three-dimensional charts. The user interface enables the user to drag the data point value along any trajectory in a multi-dimensional space, for example, a two dimensional space for a three dimensional chart. As the user drags the data point along any trajectory, results of comparison between other charts and the reference charts are displayed or an aggregate value based on data values from all charts being compared is displayed.

Figure 5:
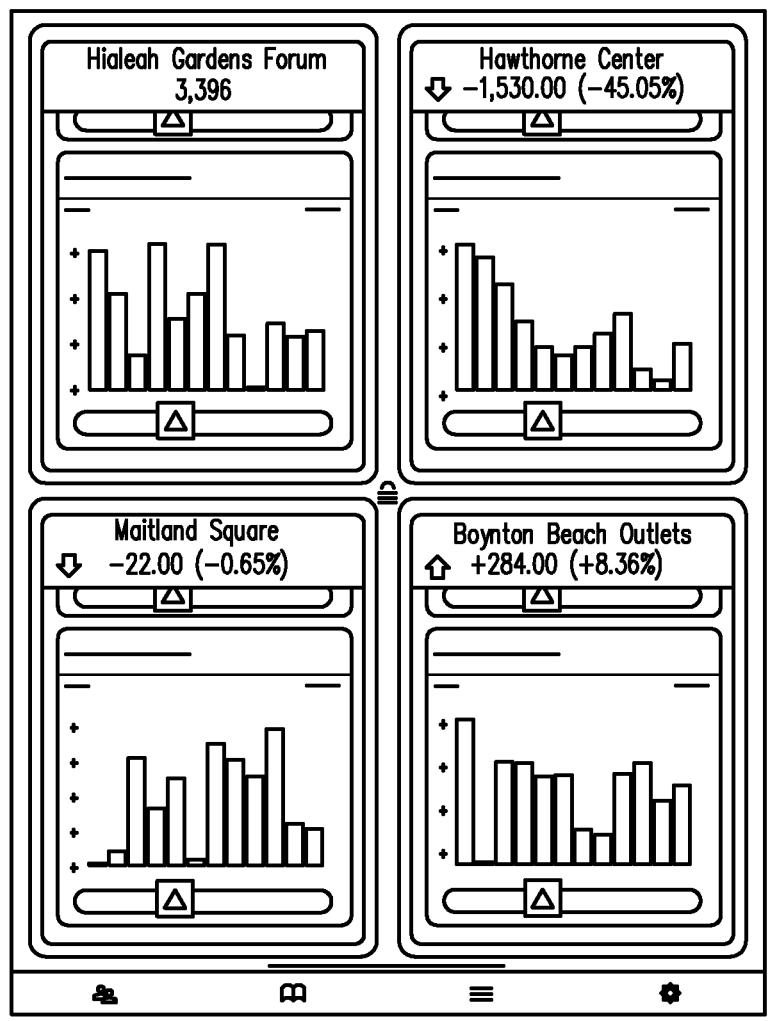
FIG. 5 shows a graphical display illustrating comparison of data sets presented as bar graphs, in accordance with an embodiment of the present invention.

FIG. 5 shows a graphical display illustrating comparison of data sets presented as bar graphs, in accordance with an embodiment of the present invention. The data values of each chart are presented as bars corresponding to the data points. The presentation of the comparison of the data values from the different charts is similar to that described for FIGS. 4(a), 4(b), and 4(c). The user can select a data point by identifying a coordinate value along the x-axis or by selecting any portion of the bar corresponding to the data point.

Figure 6A:
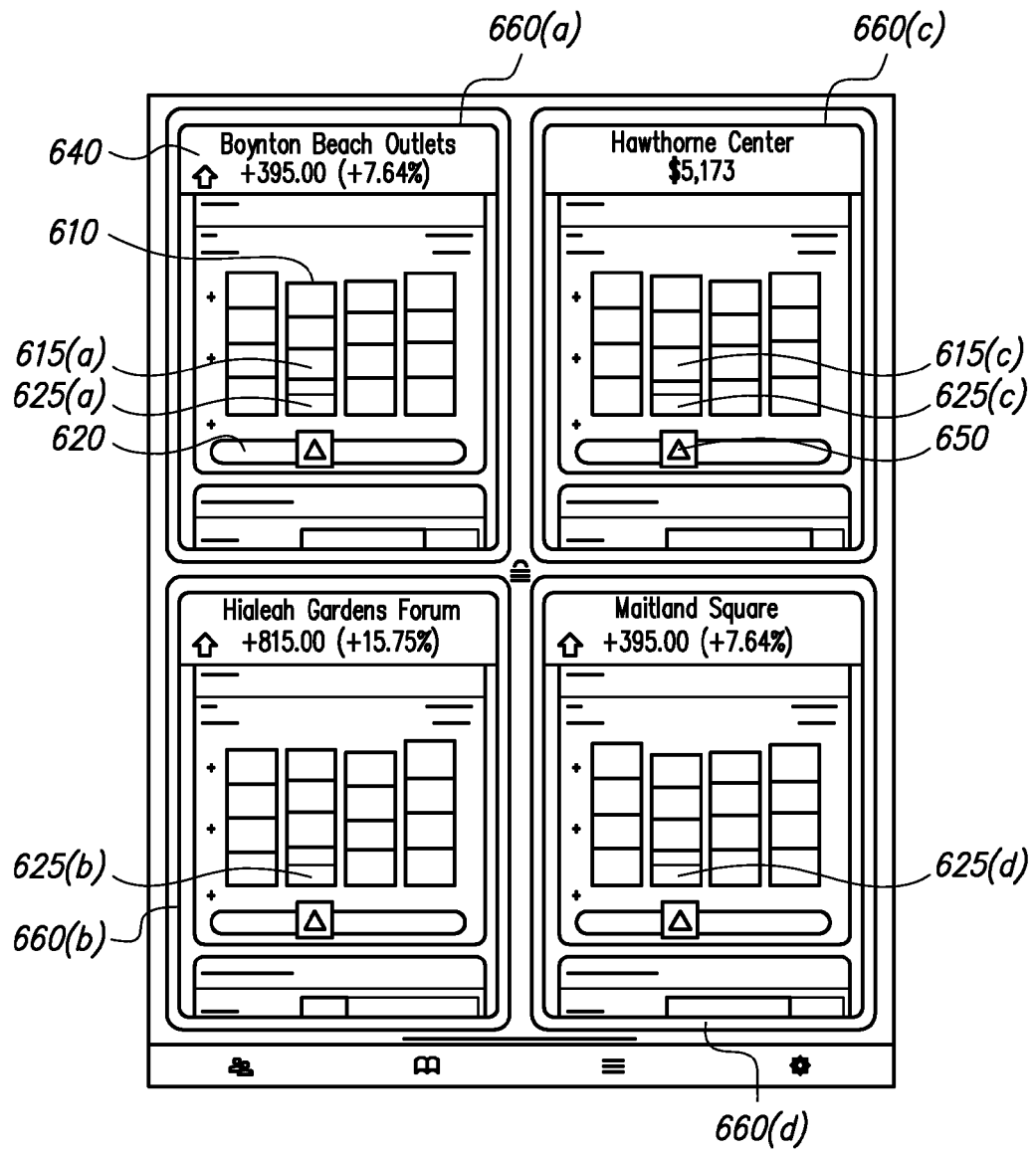
FIGS. 6(a) and 6(b) show a graphical display illustrating comparison of data sets presented as stacked bar charts, in accordance with an embodiment of the present invention.
Figure 6B:
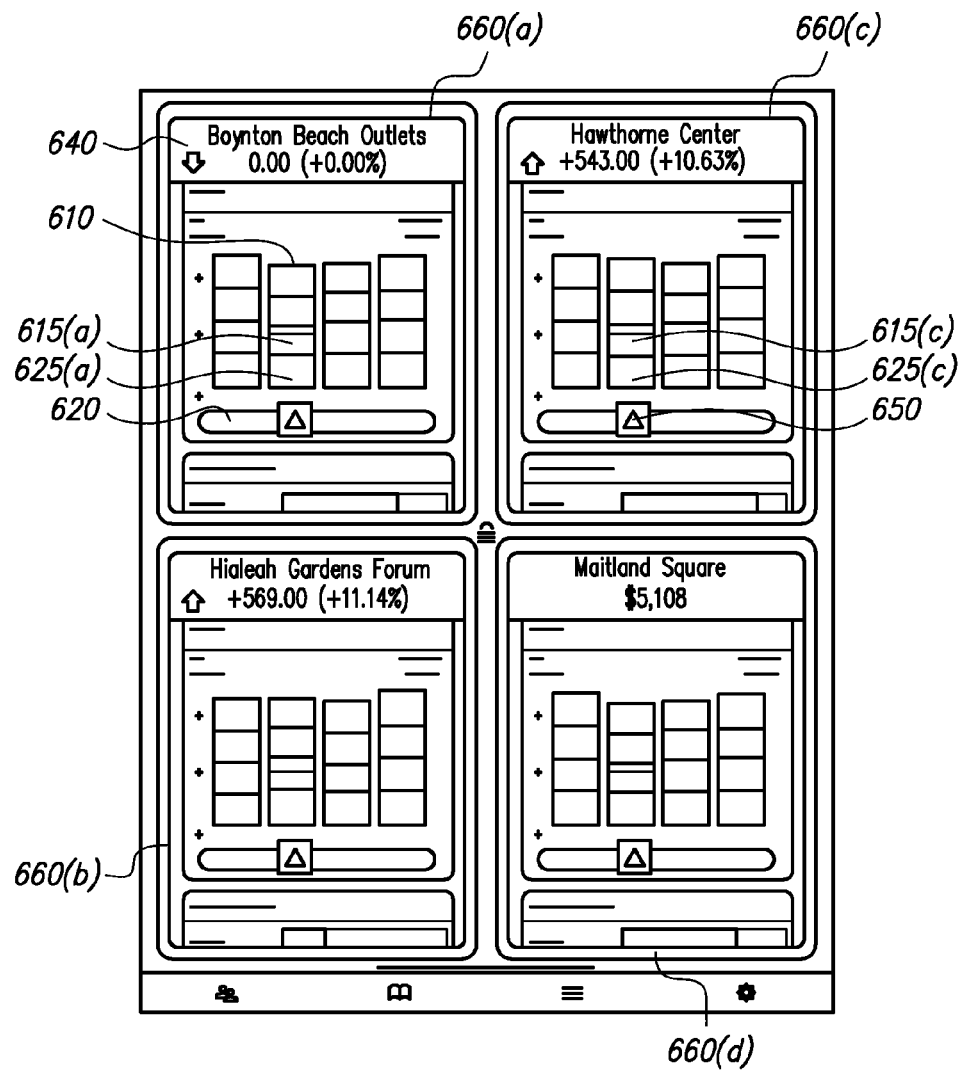

FIGS. 6(a) and 6(b) show a graphical display illustrating comparison of data sets presented as stacked bar charts, in accordance with an embodiment of the present invention. Each source value along the x-axis 620 may be mapped to a plurality of data values represented as stacked bars 610. Each stacked bar 610 comprises multiple individual bars. As an example, a stacked bar 610 may represent sales associated with products of a company and each individual bar may represent the sales for a particular product. For example, bars 615 represent sales of laptops whereas bars 625 represent sales of radios.

The user selects a source value 650 along the x-axis of chart 660(c) to compare the results of radios represented as bar 625(c) with the results of radios represented as bars 625(a), 625(b), 625(d) from the other charts 660(a), 660(b), 660(d) respectively. The results of the comparison are displayed in the regions 640 corresponding to each chart. For example, the region 640 of chart 660(a) displays the value +395.00 showing the difference between the values $5,568 corresponding to bar 625(a) and $5,173 corresponding to bar 625(c). The region 640 shows a '+' sign with the value 395.00 indicating that the value of bar 625(a) is larger than the value of bar 625(c). The region 640 shows an up arrow indicating that bar 612(a) represents a larger value than bar 625(c). The region 640 shows a value +7.64% indicating a percentage increase in the value of bar 625(a) compared to value of bar 625(c). Since comparison of the reference chart 660(c) with itself may not be interesting to a viewer, the region 640 of chart 660(c) presents the value of the bar 625(c), i.e., $5,173. Similarly, in FIG. 6(b) the user wants to compare the results of laptops represented as bars 615. The comparison of the bar 615(c) of chart 660(c) with bars 615(a), 615(b), 615(d) of charts 660(a), 660(b), 660(d) respectively is displayed in the regions 640 of each chart.

If the user selects the data point without indicating which individual bar from the stacked bar to compare, a plurality of data values obtained by comparison of each of the bars from the selected stacked bar may be presented. For example, the region 640 may display a vector of four values obtained by comparison of each bar from the stacked bar 610. Alternatively, a comparison of a predetermined statistical measure based on the values associated with each stacked bar may be presented. For example, for a selected source value 650 from a reference chart 660(c), the average values corresponding to the individual bars of a stacked bar is compared for every other chart 660(a), 660(b), 660(d) with respect to the average value corresponding to the stacked bar of chart 660(c).

Figure 7:
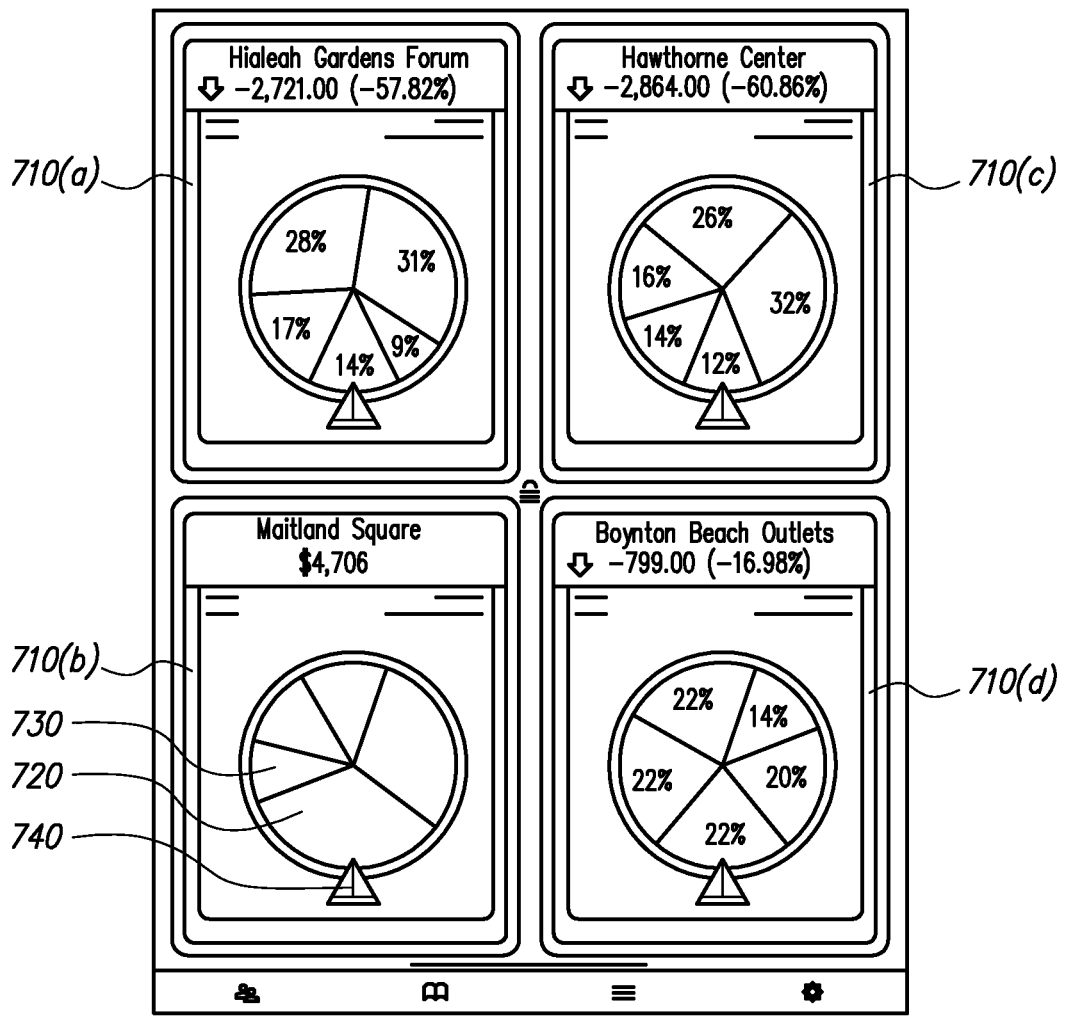
FIG. 7 shows a graphical display illustrating comparison of data sets presented as pie charts, in accordance with an embodiment of the present invention.

FIG. 7 shows a graphical display illustrating comparison of data sets presented as pie charts, in accordance with an embodiment of the present invention. Each chart 710 displayed in the data comparison panel 130 is a pie chart. For example, each slice of the pie may correspond to a category, for example, sales of a product for an organization. The slices from different charts that represent the value for a particular category can be identified by their color or shading. For example, the slices of the charts 710(a), 710(b), 710(c), 710(d) corresponding to product 720 (say PDAs) may be represented using red color whereas the slices corresponding to product 730 (say laptops) may be represented using blue color.

The pointer 740 points at a slice corresponding to a source value from a reference chart 710(b). The corresponding slices from the charts 710(a), 710(c), 710(d) are compared against the slice of the reference chart 710(b). If the user further rotates the pie of chart 710(b) to align the slice corresponding to product 720 with the pointer 740, the user interface manager 215 rotates the other charts 710(a), 710(c), 710(d) so as to align the corresponding slices for product 720 with their pointers. The user interface manager 215 also presents the results of comparison of the slices from the charts 710(a), 710(c), 710(d) corresponding to product 720 with the corresponding slice from reference chart 710(b).

Multi-Touch Input

Figure 8:
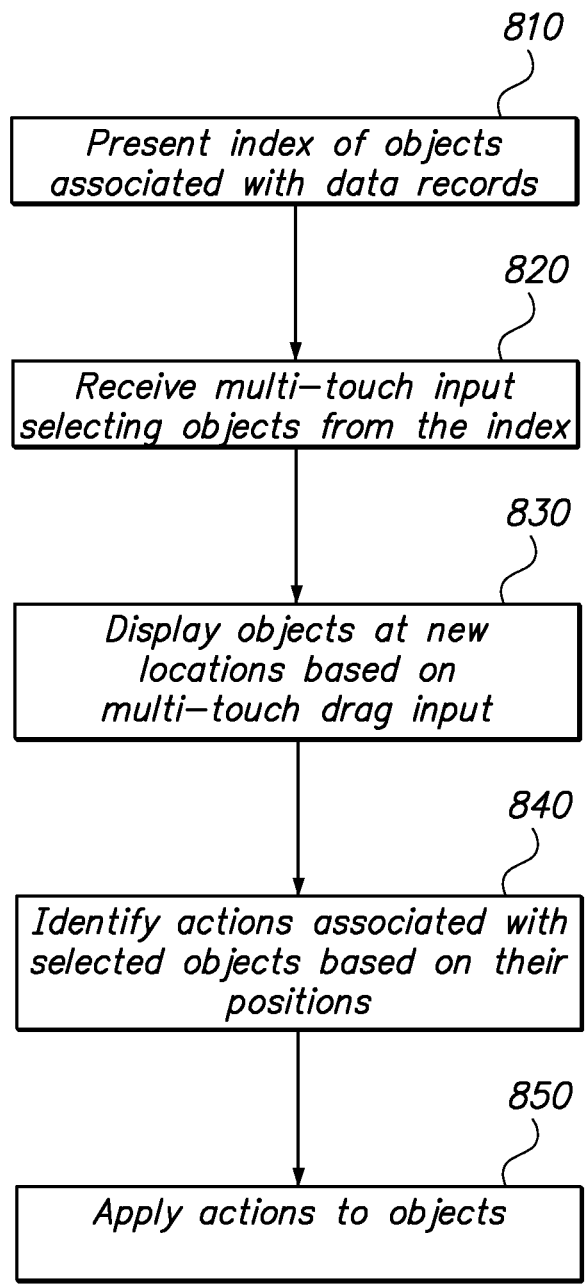
FIG. 8 shows a flowchart illustrating how multi-touch input is used to perform actions associated with selected objects, in accordance with an embodiment of the present invention.

FIG. 8 shows a flowchart illustrating how multi-touch input is used to perform actions associated with selected objects, in accordance with one embodiment of the present invention. The user interface manager 215 presents 810 an index of data records obtained from the database 205. In one embodiment, the data records may be displayed as a simulated catalogue displaying pages of data from a report stored in the database 205. Each data record may be displayed as an object, for example, cards of the simulated index as illustrated in FIGS. 1(a) and 1(b). An object associated with a data record provides a visual representation of the data record. A user can view data records from the index by performing a swiping motion causing the cards of the catalogue to move in the direction of the swipe, such that they appear to either move backwards from the viewer or forward towards the viewer. A user can select a record to perform an action based on the record, for example, view detailed information associated with the record.

The user interface manager 215 receives 820 multi-touch input from a user who is selecting more than one object from the index. For example, a user may use multiple fingers on a touch screen to select multiple cards of the catalogue. The user may use the multi-touch input to drag the selected objects from the index to another portion or portions of the display screen 225. The user interface manager 215 displays 830 the selected data sets at new locations based on the multi-touch drag input from the user. The user can drag the data sets to a particular region of the display screen. The user may drag the representations of the data sets such that each data set is moved to a different region of the display screen. The user may drag the data sets such that the representations of the selected data sets overlap with each other on the display screen 225. The user can change the relative positions of the selected objects as they are dragged, for example, by increasing or decreasing the distance between the objects.

The user interface manager 215 identifies 840 actions associated with the selected objects based on their positions. The user interface manager 215 applies the actions based on the objects. The actions may perform a computation based on the data records associated with the objects and display the result of the computation. Alternatively, the actions may move the data objects to certain positions determined by the multi-touch input. For example, a first object may be moved to a first position and a second object may be moved to a second position. The corresponding positions may have a particular significance in terms of defining subsequent actions associated with the objects. For example, placing an object in a first position may mark the first object as a reference object for comparison with other objects.

Figure 9:
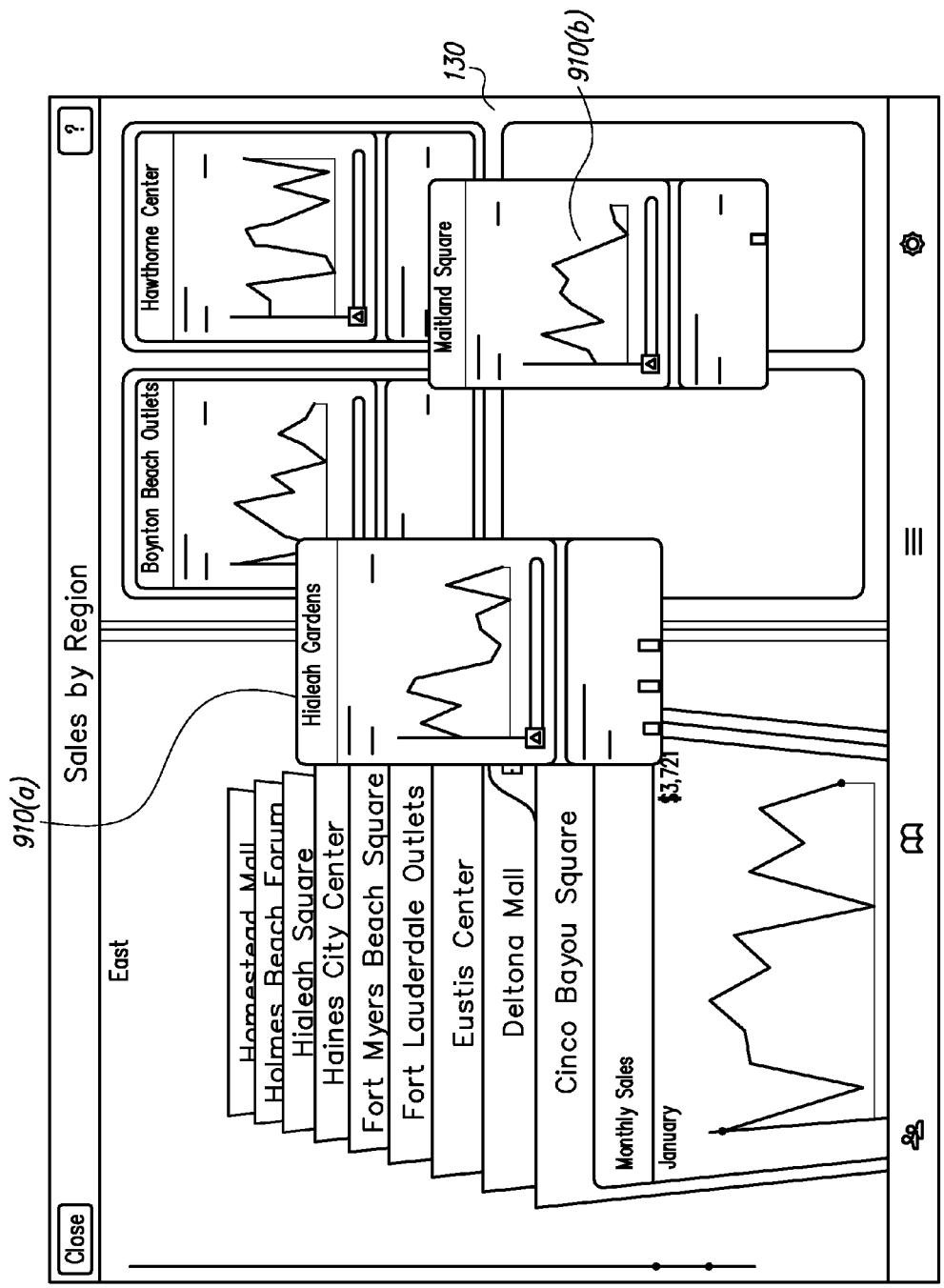
FIG. 9 shows an embodiment of a graphical display illustrating a database record shown as missing from the simulated catalogue responsive to a user selecting the record and dragging it to another region of the display.

FIG. 9 shows a graphical display illustrating how multi-touch input is used to perform actions on selected objects, in accordance with an embodiment of the present invention. As shown in FIG. 9, each object associated with a data record is a chart and the multi-touch input is used to drag multiple charts to a data comparison panel 130 of the display screen 225. The user can further perform data comparison of the charts as illustrated in FIG. 3.

Figure 10:
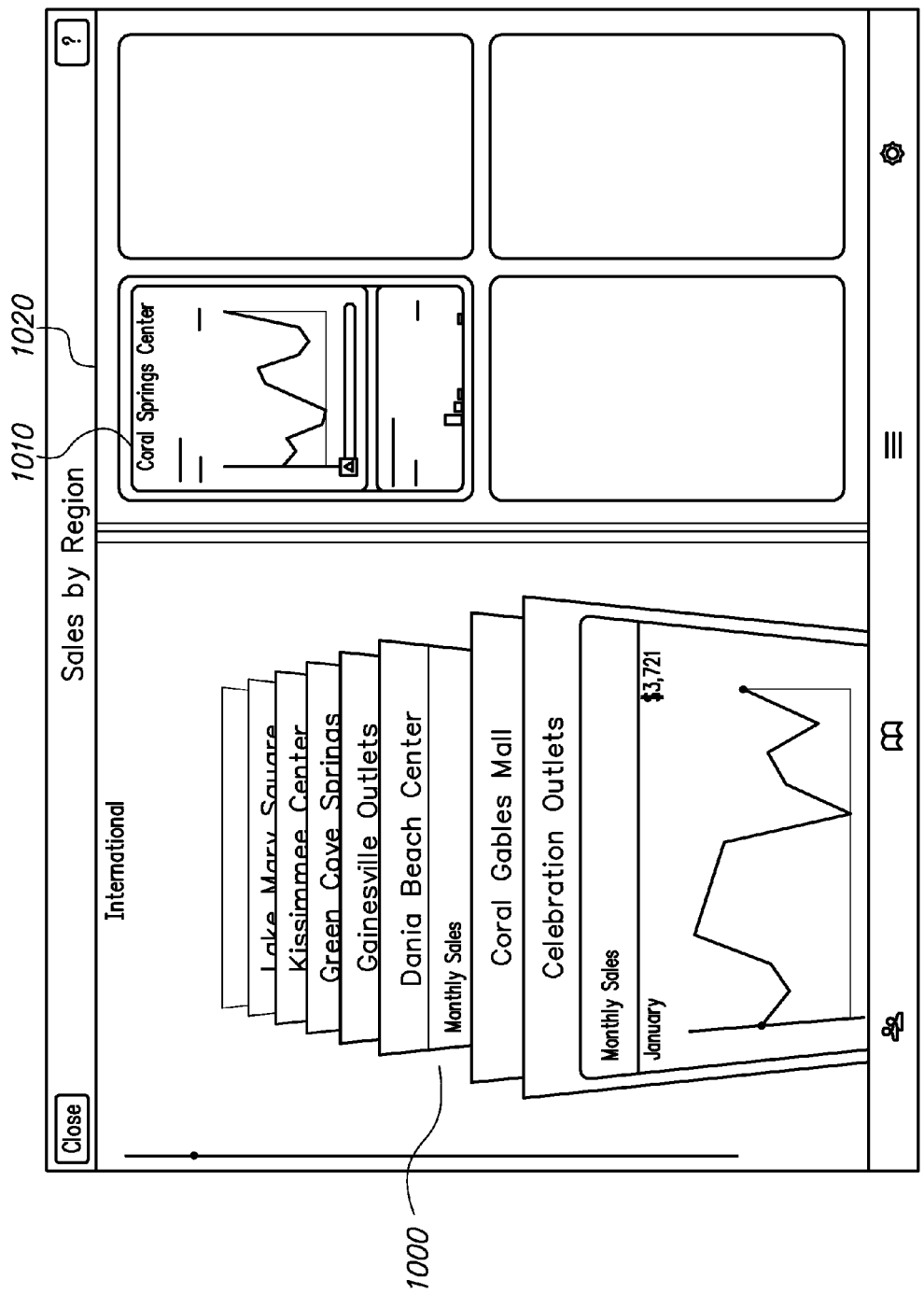
FIG. 10 shows a graphical display illustrating how multi-touch input is used to perform correlated actions on selected objects, in accordance with an embodiment of the present invention.

In an embodiment, dragging a data set out of the index changes the display of the index such that the index shows the data records missing from the index. FIG. 10 shows an embodiment of a graphical display illustrating a database record shown as missing from the simulated catalogue responsive to a user selecting the record 1010 and dragging it to another region 1020 of the display. The portion of the simulated catalogue that shows the database record as missing can show a gap 1000 in a sequence of records at the position of the missing record. If the user drags a record to a position showing a gap 1000, the data record is inserted in that position.

In one embodiment, when two or more objects are dragged from the index using the multi-touch input each dragged object is associated with a new position as a result of the drag input. The position of each object determines the action associated with each object. In one embodiment, a region of a display screen may be associated with an action. For example, if the multi-touch input is used to select two objects A and B, and the object A is dragged on to the data comparison panel 130 whereas the object B stays in the panel displaying the index, the actions performed on the two objects may be different. For example, the object A selected to the data comparison panel 130 may be automatically inserted in a position for allowing data comparison. On the other hand, the object B may be deleted from the index. Alternatively, the object B may be returned back to its original position.

The actions performed may be combined into a single action associated with all the objects being dragged. For example, if two objects are dragged to a particular region of the display screen, an aggregate value based on the data records associated with the objects may be presented. The metric used to determine the aggregate value may depend on the region of the display screen 225 on which the objects are positioned. For example, positioning the objects over a region may result in a comparison of their data records being displayed, positioning the objects over another region may result in a mean value based on their data records being displayed, and positioning the objects over yet another region may result in a median value based on their data records being displayed. This enables a user to view different results associated with the data records by performing a single drag operation over the appropriate regions using the records. In an embodiment, the multi-touch input can be used to swap the positions of two data records in the index. For example, the multi-touch input can be used to simultaneously remove two data records from their respective positions and insert each record in the position of the other record.

In one embodiment, the actions performed on the objects depend on the distance between the objects as they are dragged. For example, if the multi-touch input separates the two objects by more than a threshold distance while dragging them, a particular type of action is performed. On the other hand if the multi-touch input brings the two objects closer than a threshold distance while dragging them, a different type of action is performed. For example, if the two objects are positioned so as to overlap with each other, a predefined merge operation may be performed on the associated data records.

Alternative Embodiments

In one embodiment, the user is allowed to drag a data set to any position in between two data sets, whether or not there is a gap displayed between the data sets. If a gap is displayed in the position where the data set is dragged, the data set in inserted in that position. If there is no gap in the position where the record is being inserted, the data sets of the index are shifted by a position to create a gap for inserting the data set. A database record corresponding to the data set inserted may be stored in the database 205 and information indicating any associated changes to the sequence of the database records is also stored in the database 205.

It is to be understood that the figures and descriptions of the present invention have been simplified to illustrate elements that are relevant for a clear understanding of the present invention, while eliminating, for the purpose of clarity, many other elements found in a typical system that allows users to view report data. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for performing comparison of data presented as charts through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

I claim:

1. A computer-implemented method for displaying on a display screen a comparison of data presented as charts, the method comprising:

displaying a plurality of charts simultaneously on a screen of a portable display device, each chart including a plurality of records obtained from reports based on statistical data of an organization, each record having a first variable, a second variable, and a third variable, the first variable representing a time value, the second variable representing a statistical data value and the third variable representing an attribute of the organization, each chart mapping a set of time values to a set of statistical data values for a particular value of the third variable, each chart associated with a slider for receiving selections of records, the plurality of charts comprising a first chart and a second chart, wherein the first chart maps a first set of time values to a first set of statistical data values and the second chart maps the first set of time values to a second set of statistical data values, wherein the first set of statistical data values is distinct from the second set of statistical data values;

receiving an input selecting a first record of a first chart using the slider, the first record having a first time value and a first statistical data value, the first chart included in the plurality of displayed charts, wherein each of the other charts in the plurality of charts maps the first time value to a statistical data value distinct from the first statistical data value;

responsive to the selection of the first record of the first chart, modifying the display of each of the other charts in the plurality of charts displayed simultaneously on the screen of the portable display device, the modifying comprising, for each of the other charts:

displaying a matching record from the other chart, wherein the time value of the matching record matches the first time value and a visual representation of the matching record in the chart distinguishes the matching record from a visual representation of remaining records of the chart; and displaying in association with the other chart, indicia of a difference between the statistical data value of the matching record from the chart and the first statistical data value of the first record;

receiving a dynamic input indicating movement along the slider, the movement causing the first time value to change; and responsive to the dynamic input, modifying the display of each of the other charts by updating the indicia of difference between the statistical data value of the other chart for the first time value and the statistical data value of the first chart for the first time value as the first time value changes.

2. The method of claim 1, further comprising:
displaying an index of database records, each database record associated with a chart; and
receiving a selection of the plurality of charts from the index.

3. The method of claim 2, wherein each selection of a chart from the index causes the index to display a gap in place of the selected chart.

4. The method of claim 2, wherein each selection of a data set from the index causes a chart corresponding to the selected data set to appear in a display portion of the screen adjacent to the index.

5. The method of claim 1, wherein a chart is one of a pie chart, a line chart, a bar chart, or a stacked bar chart.

6. The method of claim 1, wherein a chart is a stacked bar chart and the statistical data value of the first record is an aggregate value based on the stacked bars for the first time value.

7. The method of claim 1, wherein a chart is a stacked bar chart and the first time value comprises a selection of a bar from a stacked bar of the first record.

8. The method of claim 1, wherein each chart is a pie chart associated with a pointer, the method further comprising:
receiving a first input causing a first source sector of a first pie chart to be aligned to the pointer corresponding to the first pie chart;
responsive to receiving the first input, modifying each of the other pie charts, the modifying comprising, for each of the other pie charts:
presenting the pie chart such that a first matching sector corresponding to the first source sector is aligned with the pointer of the pie chart;
receiving a second input causing a second source sector of the first pie chart to be aligned with the pointer of the first pie chart; and
responsive to receiving the second input, modifying each of the other pie charts, the modifying comprising, for each of the other pie charts:
presenting the pie chart such that a second matching sector of the pie chart corresponding to the second source sector is aligned with the pointer of the pie chart.

9. A method for displaying on a display screen aggregate values based on data from charts, the method comprising:
presenting a plurality of charts simultaneously on a screen of a portable display device, each chart comprising records obtained from reports based on statistical data of an organization, each record having a first variable, a second variable, and a third variable, the first variable representing a time value, the second variable representing a statistical data value and the third variable representing an attribute of the organization, each chart mapping a set of time values to a set of statistical data values for a particular value of the third variable, each chart associated with a slider for receiving selections of records, the plurality of charts comprising a first chart and a second chart, wherein the first chart maps a first set of time values to a first set of statistical data values and the second chart maps the first set of time values to a second set of statistical data values, wherein the first set of statistical data values is distinct from the second set of statistical data values;
receiving an input identifying a first time value using the slider, wherein each of the charts in the plurality of charts maps the first time value to a distinct statistical data value;
responsive to receiving the input identifying the first time value, modifying the display of each of the plurality of charts displayed simultaneously on the screen of the portable display device to display a matching record from the chart, wherein the time value of the matching record matches the first time value and a visual representation of the matching record in the chart distinguishes the matching record from a visual representation of remaining records of the chart; and
presenting an aggregate value based on the statistical data values from the matching records from each of the plurality of chart;
receiving a dynamic input indicating movement along the slider, the movement causing the first time value to change; and
responsive to the dynamic input, modifying the display of each of the other chart by updating the aggregate value based on the statistical data values from matching records as the time value changes.

10. The method of claim 9, wherein an aggregate value comprises a statistical metric based on target values from the displayed records.

11. The method of claim 9, wherein the aggregate value comprises indicia of a difference between target values of displayed records from two of the plurality of charts.

12. The method of claim 9, further comprising:
presenting an index displaying database records, each database record associated with a chart; and
receiving a selection of the plurality of charts from the index.

13. A computer-implemented system for displaying on a display screen comparison of data presented as charts, the system comprising:
a computer processor; and
a computer-readable storage medium storing computer program modules configured to execute on the computer processor, the computer program modules comprising:
an user interface manager module configured to:
display a plurality of charts simultaneously on a screen of a portable display device, each chart including a plurality of records obtained from reports based on statistical data of an organization, each record having a first variable, a second variable, and a third variable, the first variable representing a time value, the second variable representing a statistical data value and the third variable representing an attribute of the organization, each chart mapping a set of time values to a set of statistical data values for a particular value of the third variable, each chart associated with a slider for receiving selections of records, the plurality of charts comprising a first chart and a second chart, wherein the first chart maps a first set of time values to a first set of statistical data values and the second chart maps the first set of time values to a second set of statistical data values, wherein the first set of statistical data values is distinct from the second set of statistical data values;
receive an input selecting a first record of a first chart using the slider, the first record having a first time value and a first statistical data value, the first chart included in the plurality of displayed charts, wherein each of the other charts in the plurality of charts maps the first time value to a statistical data value distinct from the first statistical data value;
responsive to the selection of the first record of the first chart, modify the display of each of the other charts in the plurality of charts displayed simultaneously on the screen of the portable display device, the modifying comprising, for each of the other charts:
displaying a matching record from the chart, wherein the time value of the matching record matches the first time value and a visual representation of the matching record in the chart distinguishes the matching record from a visual representation of remaining records of the chart; and
displaying in association with the chart, indicia of a difference between the statistical data value of the matching record from the chart and the first statistical data value of the first record;
receive a dynamic input indicating movement along the slider, the movement causing the first time value to change; and
responsive to the dynamic input, modifying the display of each of the other chart by updating the indicia of difference between the statistical data value of the other chart for the first time value and the statistical data value of the first chart for the first time value as the first time value changes.

14. A non-transitory computer-readable storage medium storing computer-executable code for displaying on a display screen comparison of data presented as charts, the code comprising:
an user interface manager module configured to:
display a plurality of charts simultaneously on a screen of a portable display device, each chart including a plurality of records obtained from reports based on statistical data of an organization, each record having a first variable, a second variable, and a third variable, the first variable representing a time value the second variable representing a statistical data value and the third variable representing an attribute of the organization, each chart mapping a set of time values to a set of statistical data values for a particular value of the third variable, each chart associated with a slider for receiving selections of records, the plurality of charts comprising a first chart and a second chart, wherein the first chart maps a first set of time values to a first set of statistical data values and the second chart maps the first set of time values to a second set of statistical data values, wherein the first set of statistical data values is distinct from the second set of statistical data values;
receive an input selecting a first record of a first chart using the slider, the first record having a first time value and a first statistical data value, the first chart included in the plurality of displayed charts, wherein each of the other charts in the plurality of charts maps the first time value to a statistical data value distinct from the first statistical data value;
responsive to the selection of the first record of the first chart, modify the display of each of the other charts in the plurality of charts displayed simultaneously on the screen of the portable display device, the modifying comprising, for each of the other charts:
displaying a matching record from the chart, wherein the time value of the matching record matches the first time value and a visual representation of the matching tuple in the chart distinguishes the matching record from a visual representation of remaining records of the chart; and
displaying in association with the chart, indicia of a difference between the statistical data value of the matching record from the chart and the first statistical data value of the first record;
receive a dynamic input indicating movement along the slider, the movement causing the first time value to change; and
responsive to the dynamic input, modifying the display of each of the other chart by updating the indicia of difference between the statistical data value of the other chart for the first time value and the statistical data value of the first chart for the first time value as the first time value changes.

15. A computer-implemented method for displaying on a display screen a comparison of data presented as charts, the method comprising:
presenting an index displaying database records, each database record associated with a chart;
receiving a selection of a plurality of charts from the index;
presenting the plurality of charts simultaneously on a screen of a portable display device, each chart displaying a plurality of records obtained from reports based on statistical data of an organization, each record having a first variable, a second variable, and a third variable, the first variable representing associating a time value, the second variable representing a statistical data value and the third variable representing an attribute of the organization, each chart mapping a set of time values to a set of statistical data values for a particular value of the third variable, wherein the sets of time values for the plurality of charts include one or more time values common to each of the sets of time values, each chart associated with a slider for receiving selections of records, the plurality of charts comprising a first chart and a second chart, wherein the first chart maps a first set of time values to a first set of statistical data values and the second chart maps the first set of time values to a second set of statistical data values, wherein the first set of statistical data values is distinct from the second set of statistical data values;

receiving an input identifying a first record from a first chart using the slider, the first record associating a first time value with a statistical data value, wherein each of the other charts in the plurality of charts maps the first time value to a statistical data value distinct from the first statistical data value;

responsive to the selection of the first record of the first chart, modifying the display of each of the other charts in the plurality of charts displayed simultaneously on the screen of the portable display device, the modifying comprising, for each of the other charts:

displaying a matching record from the chart, wherein the time value of the matching record matches the first time value and a visual representation of the matching record in the chart distinguishes the matching record from a visual representation of remaining records of the chart;

displaying in association with the chart, indicia of a difference between the statistical data value of the matching record and the statistical data value of the first record;

receiving a dynamic input indicating movement causing the first time value to change; and updating for each chart the display of indicia of difference between the statistical data value of the other chart for the first time value and the statistical data value of the first chart for the first time value as the first time value changes.

16. A computer-implemented method for comparing data displayed on a plurality of charts, the method comprising:

displaying simultaneously, on a screen of a portable display device, a plurality of charts, each chart displaying a plurality of records representing statistical data obtained from reports associated with an organization, each record having a first variable, a second variable, and a third variable, the first variable representing a time value, the second variable representing a statistical data value and the third variable representing an attribute of the organization, each chart mapping a set of time values to a set of statistical data values for a particular value of the third variable, the plurality of charts comprising a first chart and a second chart, wherein the first chart maps a first set of time values to a first set of statistical data values and the second chart maps the first set of time values to a second set of statistical data values, wherein the first set of statistical data values is distinct from the second set of statistical data values;

displaying a slider associated with a reference chart from the plurality of charts;

receiving a selection of a time value based on the slider position, wherein each of the charts in the plurality of charts maps the first time value to a distinct statistical data value;

responsive to the selection of the time value, modifying each of the other charts, the modifying comprising, for each of the other charts, displaying information comparing the statistical data value of the other chart at the selected time with the statistical data value of the reference chart at the selected time;

receiving a dynamic input indicating movement along the slider, the movement causing the selection of the time value to change, thereby changing the selection of the record of the reference chart; and responsive to the dynamic input, modifying the display of each of other charts, the modifying comprising, for each of the other charts:

changing the selection of the record of the other chart as the time value changes responsive to the dynamic input; and updating the displayed comparison information for the other chart, the information comparing the statistical data value of the other chart with a statistical data value of the reference chart corresponding to the dynamically changing selection of the time value.

17. The method of claim 1, wherein the third variable represents a geographic location associated with the organization.

* * * * *